No. 857,487. PATENTED JUNE 18, 1907.
J. RIVARA.
PLOW.
APPLICATION FILED FEB. 27, 1907.
3 SHEETS—SHEET 2.
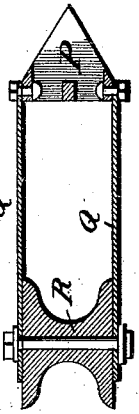
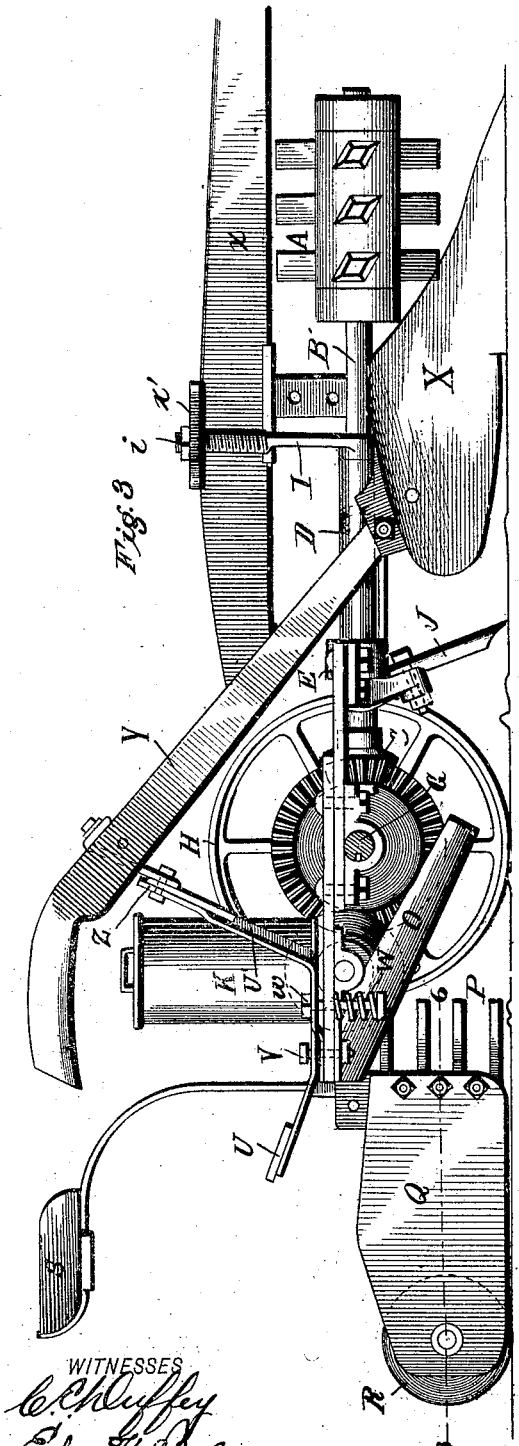
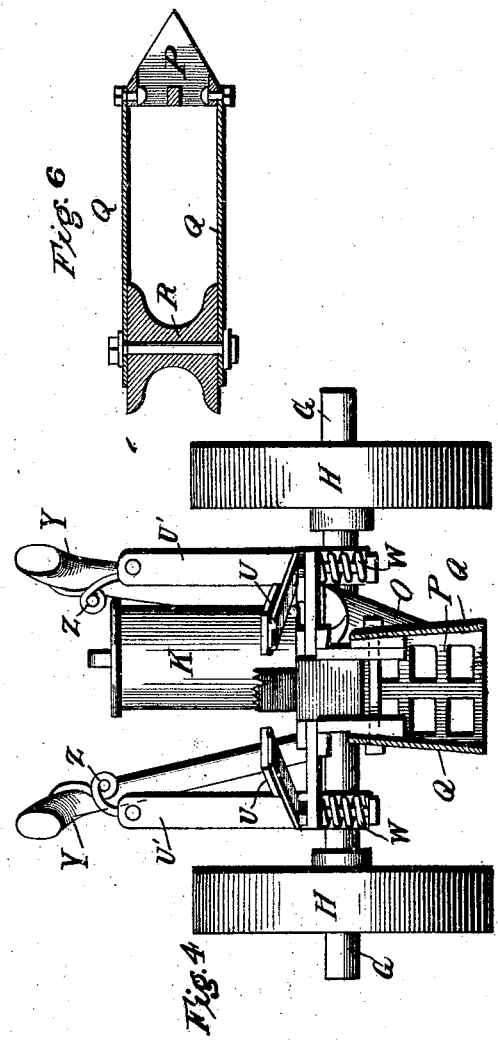
WITNESSES
INVENTOR
JAMES RIVARA
BY
ATTORNEYS

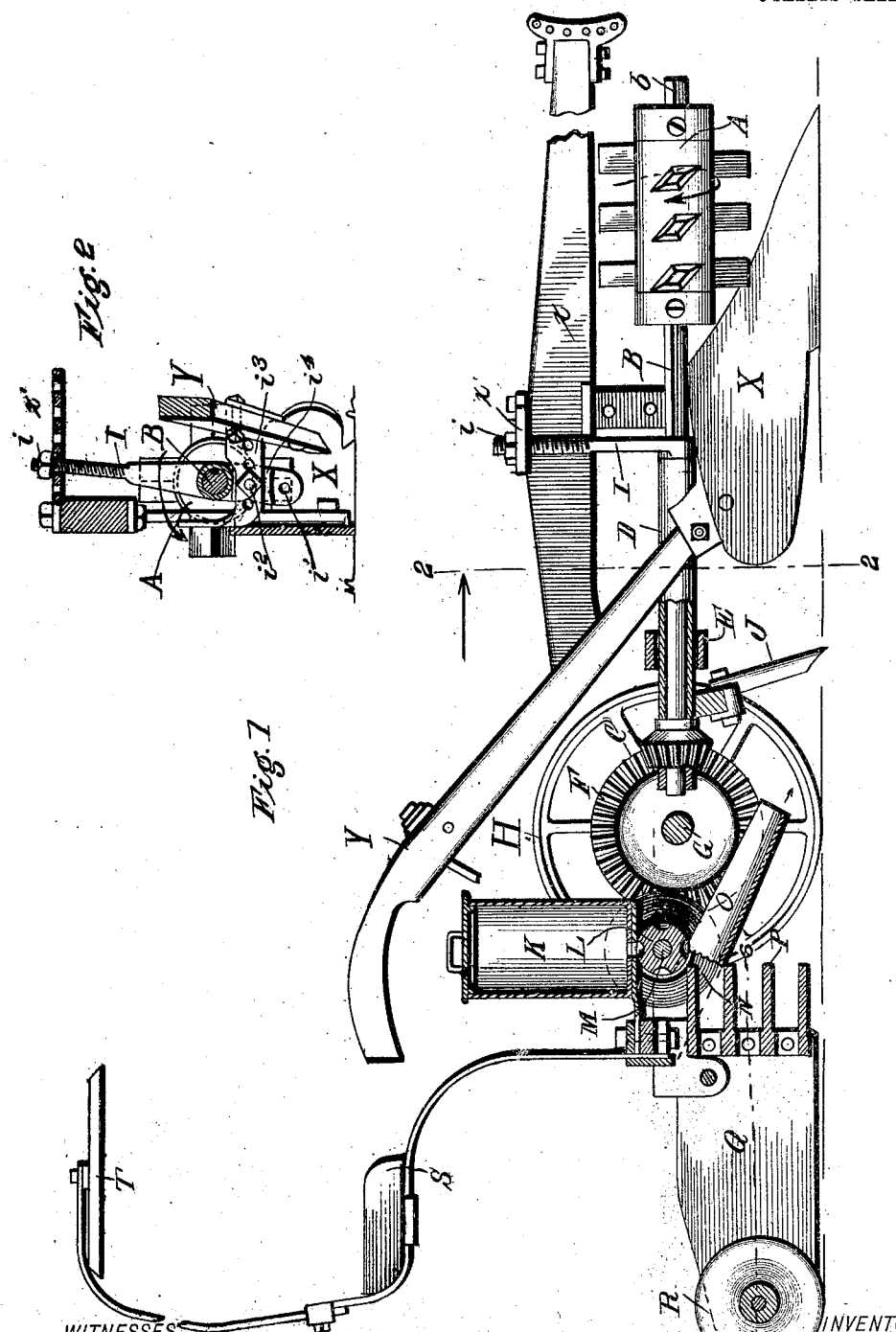

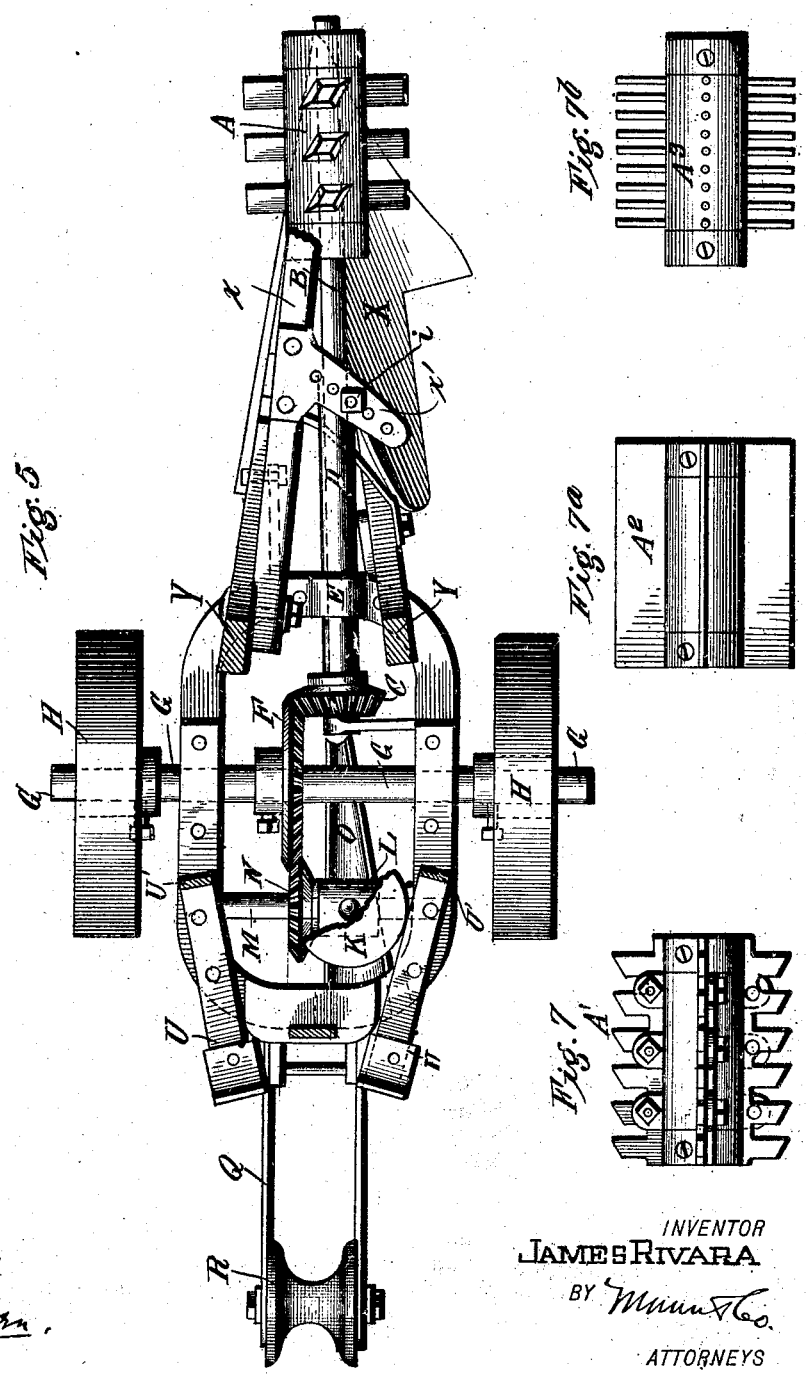

UNITED STATES PATENT OFFICE.

JAMES RIVARA, OF NATCHEZ, MISSISSIPPI.

PLOW.

No. 857,487.   Specification of Letters Patent.   Patented June 18, 1907.

Application filed February 27, 1907. Serial No. 359,595.

*To all whom it may concern:*

Be it known that I, JAMES RIVARA, a citizen of the United States, residing at Natchez, in the county of Adams and State of Mississippi, have invented a new and useful Improvement in Plows, of which the following is a specification.

The object of my invention is to provide a plow for turning a furrow, breaking up the sod, harrowing and pulverizing it and uprooting and destroying grass and weeds and grinding them into bits and bringing the land into order for planting, with much less labor than is usually employed.

The leading feature of my invention is in the nature of a rotating plow head, which is combined with and located immediately above and in front of the mold board on a horizontal axis extending longitudinally beneath the beam and which rotating plow head helps to turn over the slice of earth as it is lifted from the furrow by the mold board and at the same time cuts or slices and pulverizes the slice of earth, grinding up the roots and weeds and acting as a harrow to bring the land into order at one pass over the ground.

The invention also consists in the combination with this plow of seeding and planting devices which will be hereinafter fully described with reference to the drawings, in which Figure 1 is a side elevation of the plow with the seeding and planting devices in vertical section. Fig. 2 is a transverse vertical section on line 2—2 of Fig. 1, looking in the direction of the arrow. Fig. 3 is an enlarged side elevation. Fig. 4 is a rear end elevation with the riding seat removed. Fig. 5 is a top plan view, with the seed box, plow handles and riding seat removed. Fig. 6 is a horizontal sectional detail on line 6—6 of Fig. 3 and Figs. 7, 7ª and 7ᵇ are details of modified forms of plow heads that may be used.

Referring to Fig. 1, X is an ordinary mold board plow adapted to turn the furrow and lay the slice of sod upside down. This mold board plow has the usual beam $x$ and handles Y Y. A is my plow head. This is a rotating member fixed to an axial shaft B which projects horizontally above and slightly in front of the mold board of the plow below the beam. This rotating head may vary in its construction, but as shown in Figs. 1, 3 and 5, it consists of a hub provided with a number of cutting blades set obliquely, like propeller blades, and of any desired number and size. This plow head is given, through the shaft B and the gears hereafter described, a rotation in the direction of the arrow in Fig. 2 which causes the lower half of the head to move in harmony with the turning direction of the slice of sod being turned over by the mold board, thus helping over the sod, which sometimes has a tendency to drop back again into the furrow without being turned. The rotary head insures the complete inversion of the sod and the rotting of the grass and weeds and killing of the roots, and also, at the same time, cuts or slices transversely the sod as it is turned and pulverizes and breaks up or comminutes the earth like a harrow and grinds up and tears loose all roots, thus insuring the dying of the same and at the same time bringing the ground into a fine pulverized condition at one pass of the plow, ready for planting.

The revolving head may be made with teeth like harrow teeth, as seen at $A^3$ in Fig. 7ᵇ, or with saw-shaped teeth $A'$ as in Fig. 7, or it may have simply longitudinal blades $A^2$ arranged parallel to the axis as seen in Fig. 7ª, or it may be of any other form. In all cases the head is adjustable longitudinally on its axis shaft by means of one or more slots $b$ in said shaft and set screws or keys on the hub of the head as seen in Fig. 1. Rotation is given to this head through its axial shaft B, Figs. 1 and 5, by means of a bevel pinion C on the rear end of the shaft engaging a bevel gear F fixed rigidly on the axle G of two running wheels H H. The axial shaft B turns in a long sleeve bearing D held in the cross bar E of the main frame of the plow.

The outer end of the shaft of the head is supported by a vertical bar I, see Fig. 2, which has a bearing in which the shaft turns. This vertical bar is arranged near the middle of the shaft and the upper end of this bar is screw threaded and extended through one of a series of holes in a wing plate $x'$, Figs. 2 and 5, bolted to the top of the plow beam and projecting laterally therefrom, said screw threaded end being secured by a nut $i$. The lower end of the vertical bar is provided with a vertical series of holes $i'$ Fig. 2 to receive a bolt $i^2$ which also passes through a horizontal stay bar $i^3$ rigidly connected to the plow inside the mold board. This stay bar has a horizontal series of holes and a wedge shaped filling block $i^4$ is arranged between the lower end of the vertical bar I and the stay bar $i^3$. These connections are designed to provide means of adjustment for the plow head in two directions. Thus when it is desired to adjust the rotary head A farther to the right or left the upper screw threaded end of the vertical bar I is adjusted to the right or left in one of the holes in the wing plate $x'$ and the bolt $i^2$ at the lower end is adjusted also to right or left in one of the holes in the horizontal stay bar $i^3$. To raise or lower the plow head, this is permitted by the screw nut $i$ and the vertical series of holes $i'$ in the lower end, the bolt $i^2$ being adjusted in one of said holes $i'$ to correspond to the up and down adjustment of the bar I. The revolving head it will be seen has therefore three adjustments, first a longitudinal sliding adjustment on the axial shaft forward or backward in the same horizontal line; second, an up and down adjustment according to the thickness of sod being turned, and third a right and left lateral adjustment according to the width of slice and movement required to turn it over.

The adjustment of the outer end of the head and axial shaft involves but a slight lateral movement for the inner end of the axial shaft, which does not interfere with the meshing of the gears and only requires a little looseness or free space in the cross bar E where the sleeve bearing D passes through it. In connection with the rotating plow head I also combine seeding and planting devices as follows. A shaft M, Fig. 5, is arranged in bearings in the main frame just behind and parallel with the axle G. A bevel gear N meshes with the bevel gear F and turns shaft M and on this shaft is a seed wheel L rotating beneath a seed box K, Fig. 1. A furrow opener J opens the furrow and the seed dropped by the seed wheel pass down a chute O into the furrow. A coverer P, Q, R, follows and covers the seed. The part P of the coverer is a vertical series of horizontal parallel and pointed blades, see Fig. 6, to which are attached two vertical side blades Q and a grooved roller R is journaled on a horizontal axis between the rear ends of the vertical side blades. The horizontal blades P scoop off clods and bring the earth over the seed to a flat level, the sides Q prevent clods from rolling back after the seed have been thus covered and the concave grooved roller, following, presses down the earth strongly on the sides and lightly in the middle, forming two little trenches which form drains for water and without making a hard crust on top of the seed. The creases left by this roller also, form a marker to show where to plant the next row Supported on the rear end of the framework is a driver's seat S and a vertically adjustable sun shade T. This seat is arranged in convenient proximity to the plow handles and to give the plowman control over the plow for guiding or holding it to its work, I employ, not only the hands of the workman, but his feet also and for this latter purpose I provide, see Figs. 3 and 4, two rearwardly projecting treadles U, fulcrumed at V so as to rock slightly in both a vertical and horizontal plane and having their forward extensions held down by springs W below the main frame and headed bolts $w$ which extend through said frame and have their heads above the treadle bars. The forward ends $U'$ of these treadle bars are bent upwardly and extend to the plow handles and have an adjustable connection Z with the same. By means of the feet on the treadles U, the plow handles may be raised or lowered and swung slightly from side to side as required by the ordinary management of a mold board plow, the feet and hands of the plowman both coöperating to permit this result and thus securing perfect control over the plow.

From the foregoing description it will be seen that I have provided a machine which plows the sod, harrows the furrows, plants the seed and covers them all in one pass of the machine over the field, thus securing a great economy of labor and teams.

I claim

1. The combination with a mold board plow; of a rotary plow head mounted on a horizontal rotary shaft immediately above and in front of the mold board and having projections adapted to engage and help turn over the sod.

2. The combination with a mold board plow; of a rotary plow head mounted on a horizontal rotary shaft immediately above and in front of the mold board and having disintegrating projections for cutting up and destroying the unity of the slice of sod simultaneously with the turning of the same.

3. The combination with a mold board plow; of a rotary plow head mounted on a horizontal rotary shaft immediately above and in front of the mold board and having obliquely arranged cutting blades for disintegrating and comminuting the sod at the moment of turning.

4. The combination with a mold board plow; of a rotary plow head and rotary shaft for the same arranged horizontally above and projecting in front of the mold board and means for adjusting the plow head longitudinally on the shaft.

5. The combination with a mold board plow; of a rotary plow head and rotary shaft for the same arranged horizontally above and projecting in front of the mold board and means for adjusting said shaft and plow head up and down.

6. The combination with a mold board plow; of a rotary plow head and rotary shaft for the same arranged horizontally above and projecting in front of the mold board and means for adjusting said shaft and head sidewise in horizontal direction.

7. The combination with a mold board plow; of a rotary plow head and rotary shaft for the same arranged horizontally above and projecting in front of the mold board and means for adjusting the forward end of said rotary head laterally in relation to the mold board in both vertical and horizontal direction.

8. The combination with a mold board plow; of a rotary plow head and axial shaft arranged horizontally above and projecting in front of the mold board, means for supporting the same, a transverse axle with running wheels and bevel gears connecting the same with the shaft of the rotary plow head.

9. The combination with a mold board plow having handles; of a rotary plow head mounted on a horizontal axial shaft immediately above and in front of the mold board, running wheels and gears for driving said rotary head from the running wheels, a driver's seat in rear of the handles and foot pedals arranged near the driver's seat and connected to the plow handles to enable him to use both his hands and feet for controlling the plow.

JAMES RIVARA.

Witnesses:
W. I. GILLESPIE,
E. F. PIPES.